Patented Feb. 21, 1939

2,148,049

UNITED STATES PATENT OFFICE 2,148,049

ELECTRIC VALVE CONTROL SYSTEM

Erwin Kern, Ennetbaden, Switzerland, assignor to Aktiengesellschaft Brown Boveri & Cie., Baden, Switzerland, a joint-stock company of the Confederation of Switzerland Application January 14, 1935, Serial No. 1,685
In Switzerland January 16, 1934

28 Claims. (Cl. 175—363)

This invention relates in general to improvements in electric valve control systems, and more particularly to means for regulating the flow of current through an electric valve in response to electrical conditions within the circuits connected therewith.

In electric valve systems in which the voltage of the valve is controlled to control the flow of current between an input circuit and an output circuit connected therewith, it is generally advantageous to regulate the flow of current in response to the value of the voltage of the output circuit or to limit the value of such current to a predetermined value. In certain systems however, such as, for example, direct current inverting systems utilized for returning current generated at a variable unidirectional voltage by an electric railway vehicle to an alternating current supply line, it is more desirable to control the flow of current through the valve by means responsive to variations in the ratio of the input and output voltages of the valve, to prevent undesirable variations of the flow of current therethrough responsive to sudden changes in the value of the voltage of one of the lines. The control should also preferably be responsive to gradual variations in the value of the flow of current through the circuit for preventing the voltage of the direct current line from rising above the normal operating value of the motors of the vehicle by an excessive amount.

It is therefore one of the objects of the present invention to provide a control system for an electric valve by which the flow of current through the valve is regulated in response to the value of the ratio of the voltages of the input and output circuits of the valve.

Another object of the present invention is to provide a control system for an electric valve by which the control of the valve in response to variations of an operating condition of the valve is obtained instantly by static means.

Another object of the present invention is to provide a control system for an electric valve by which the voltage of the input circuit of the valve is regulated in response to gradual variations of another operating condition of the valve.

Figure 1:
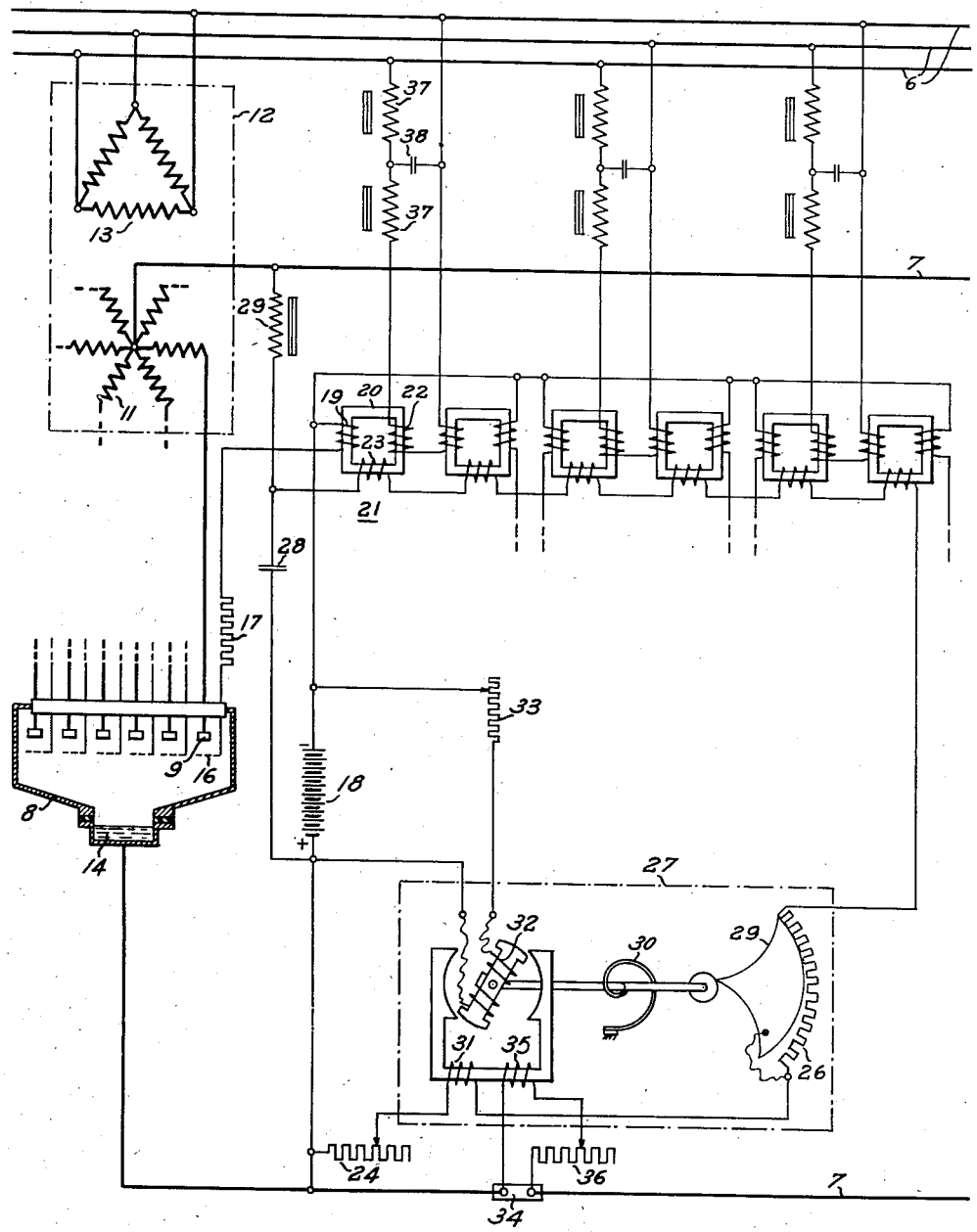
Figure 2:
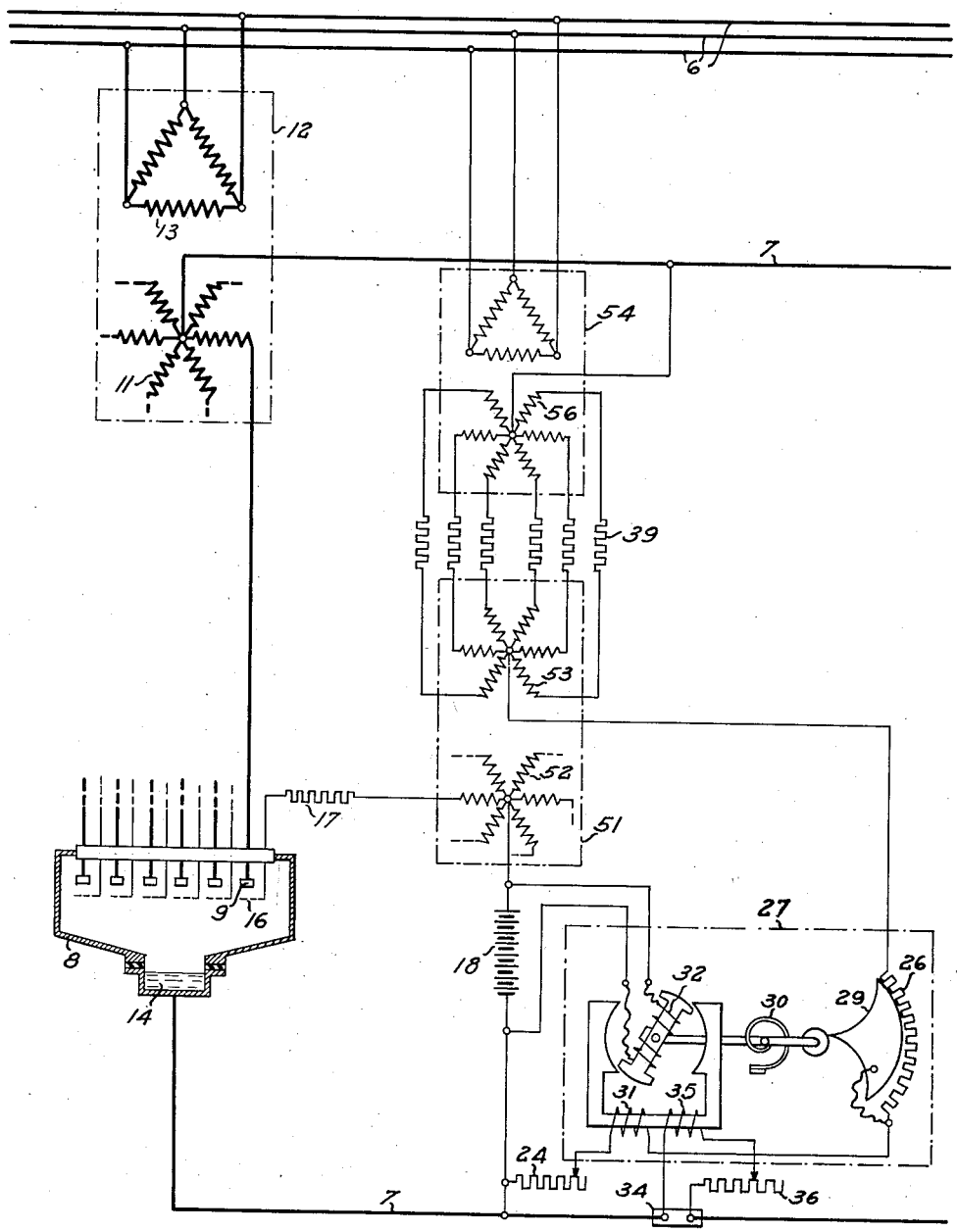
Figure 3:
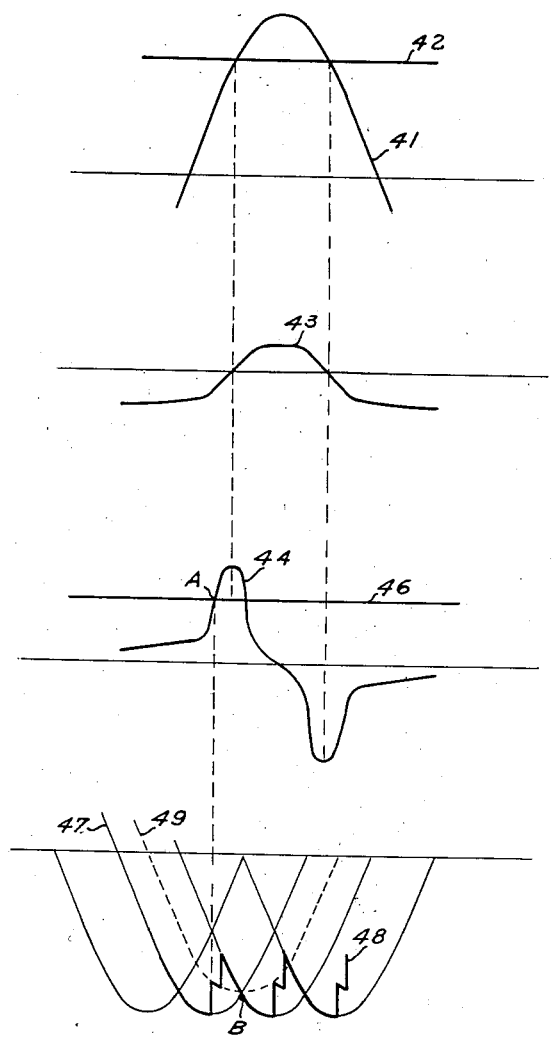

Objects and advantages other than those above set forth will be apparent from the following description when read in connection with the accompanying drawings, in which:

Fig. 1 diagrammatically illustrates one embodiment of the present invention applied to the control of a rectifying-inverting system, in which the several control electrodes of the valve are energized by means of separate transformers having direct current exciting windings;

Fig. 2 diagrammatically illustrates a modified embodiment of the present invention differing from the embodiment illustrated in Fig. 1 in that the control electrode transformers are combined into the single polyphase transformer, in which the direct current excitation component flows through the primary winding of the transformer; and Fig. 3 is a diagram illustrating the operation of the control electrodes in the embodiments illustrated in Fig. 1 and Fig. 2.

Referring more particularly to the drawings by characters of reference, reference numeral 6 designates an alternating current supply line connected with suitable generators (not shown) and with current consuming devices (not shown), so that current may be obtained therefrom or may be supplied thereto by a direct current line 7 connected therewith through an electric valve 8. The generators connected with line 6 determine the frequency and wave shape of the voltages of such line, to thereby permit commutation of the current between the anodes 9 of valve 8 during inverting operation of the system without the assistance of external means even if valve 8 is of the discontinuously controllable or vapor type. Each anode 9 is connected with one of the phase portions of a star connected winding 11 of a transformer 12 having another winding 13 connected with line 6. Valve 8 is provided with a cathode 14 connected with the positive terminal of line 7 when the system is supplying energy from line 6 to line 7, the cathode being connected with the negative terminal of line 7 when the system is returning energy from line 7 to line 6, the neutral point of winding 11 being connected with the other conductor of line 7 in both instances.

The flow of current through each anode 9 is controlled by means of an associated control electrode 16 connected with cathode 14 through an energizing circuit including suitable voltage sources, to vary the potential impressed on each control electrode 16 with respect to the potential of cathode 14 taken as datum. In the present embodiment each such circuit comprises a current limiting resistor 17, a source of negative unidirectional voltage such as a battery 18 having the positive terminal thereof connected with cathode 14, and the negative terminal thereof connected with the secondary winding 19 of a control transformer 21. Each transformer 21 is provided with a core 20 of saturable magnetic material in which the flux, which is periodically reversed, is maintained between reversals at values causing magnetic saturation of the core, as will appear hereinafter. Each transformer 21 is provided with a primary winding 22 connected with suitable ones of the conductors of line 6, the several windings 22 being connected in pairs across the different pairs of conductors of the line to thereby cause impression of six phase voltages of suitable phases on the several control electrodes of valve 8 from the associated secondary windings 23.

Each transformer 21 is also provided with a direct current exciting winding 23, the several windings 23 of the transformers being connected in series across line 7 through an adjustable rheostat 24 and through the rheostat 26 of a regulator 27. The several windings 23 are so interconnected and so arranged on the cores 20 of transformers 21 that any voltages which might be induced therein by the action of the associated windings 22 neutralize each other and do not materially affect the flow of current therethrough. Such flow of current is maintained substantially uniform irrespective of the alternating component of the voltage of line 7 by suitable filtering means, such as a capacitor 28 connected in parallel with windings 23 and rheostats 24 and 26, associated with a reactor 29 connected in series with the two parallel circuits thus established. Rheostat 26 is provided with a movable tap 29 actuated by an electromagnetic actuating mechanism acting against the action of a spring 30 preferably so dimensioned as to oppose a substantially constant torque to the movement of the regulator irrespective of the momentary position thereof. The actuating mechanism is provided with a field winding 31 connected in series with rheostat 26, and with an armature winding 32 preferably energized from a source of constant unidirectional voltage, such as battery 18, through an adjusting rheostat 33. The field of the mechanism is also provided with another winding 35 energized from a shunt 34 inserted in line 7 and acting concurrently with winding 31.

Transformer windings 22 are connected with line 6 through suitable means for maintaining the wave shape of the exciting current, flowing through such windings, of substantially invariable predetermined wave shape irrespective of the degree of saturation of the associated core 20 or of the presence of harmonic components in the voltage of line 6. It will generally be desired that the current flowing through each winding 22 be of sinusoidal wave shape of the fundamental frequency of the voltage of line 6, and the windings are accordingly connected with line 6 through filters comprising reactors 37 and capacitors 38 of such dimensions as to substantially prevent the flow through windings 22 of current of any frequencies other than such fundamental frequency. Each filter however offers, to the flow of current of fundamental frequency therethrough, an impedance which is large compared with the impedance of the associated winding 22, thereby causing the magnitude of such flow of current to be substantially unaffected by variations in the impedance of winding 22. If the voltage of line 6 is of substantially sinusoidal wave shape, each filter may be reduced to a single reactor 37 or may be replaced by resistors such as resistors 39 illustrated in Fig. 2.

The operation of the system will be better understood by reference to Fig. 3, which illustrates the conditions normally prevailing in the system during transmission of energy from line 7 to line 6 through valve 8. Curve 41 in such figure represents the magnetomotive force of one of windings 22 during a portion of the voltage cycle of line 6, such magnetomotive force being proportional at every instant to the magnitude of the current flowing through the winding 22 considered. Such current is in turn of value proportional to the voltage of line 6 but is sinusoidal irrespective of the wave shape of such voltage. The core 20 associated with the winding 22 being considered also receives another but unidirectional magnetomotive force from the associated winding 23, so that to obtain the total magnetomotive force impressed on the core 20, curve 41 is to be read with respect to a line 42 having a positive ordinate representing the magnetomotive force of winding 23, which opposes that of winding 22 during the greater portion of the period considered. The circuit of windings 23 preferably has a resistance of high value compared to the inductive reactance thereof, so that the current therethrough is of value which remains proportional to the value of the voltage of line 7 even when the latter is subjected to rapid variations.

Core 20 is so dimensioned as to reach magnetic saturation when impressed with magnetomotive forces of materially lesser magnitude than the value represented by line 42 or by the peak portion of curve 41. The magnetic flux in core 20 may accordingly be represented by a curve 43 passing rapidly through zero when the total magnetomotive force impressed on the core reverses, and remaining substantially constant at saturation value when the magnetomotive force exceeds a predetermined magnitude. The voltage induced in the associated winding 19 as a result of such flux variation may be represented by a curve 44. For the proper operation of the present embodiment, each winding 19 should be so wound that, during each positive peak portion of curve 41, the first peak of the voltage represented by curve 44 is impressed on the associated control electrode with a positive polarity, the following peak therefore being impressed with a negative polarity. Curve 44 is to be read with respect to a line 46 having a positive ordinate representing the negative voltage of battery 18, to thereby obtain the curve of variations of the potential of the control electrode 16 considered. The control electrode passes from a negative to a positive potential at a point A, thereby releasing the flow of current through the associated anode 9. Such action is repeated sequentially by the several control electrodes to regulate the flow of current between line 7 and line 6, such current being delivered to line 6 at voltages represented by sine curves such as curve 47. The voltage at which such current is received from line 7 can be represented by a curve 48 substantially consisting of similar successive portions of curves such as 47, separated by portions of other sine curves such as 49 corresponding to periods of overlap of the successive anode currents.

Under such conditions, it may frequently happen that the voltage of line 6 suddenly decreases in magnitude over a period of a few cycles as a result of a disturbance, such as a short circuit in a remote portion of the system, or of a sudden switching in of additional load, or of disconnection of generators. In the absence of any corrective measures, such momentary decrease in the magnitude of the alternating voltage will momentarily cause the flow of current between line 7 and line 6 to tend to increase very considerably. Such increase is undesirable for the reason that the operation of the motors then generating current may thereby be disturbed, and also that the flow of current may then exceed the load limit of the inverter. As is well known, when the flow of current through an inverter exceeds the so-called load limit thereof, the flow of current through an anode, operating under a voltage such as that represented by curve 47 in Fig. 3, then overlaps with the flow of current through the following anode, released at point A, over a period of time extending beyond point B at which the first operating anode becomes positive with respect to the incoming anode. Current then cannot any longer be commutated between the two anodes and the inverter then constitutes a short circuit for line 7, thereby necessitating a momentary interruption of the flow of current therethrough by means of a circuit breaker. The latter occurrence could be avoided by permanently advancing point A in the cycle to an extent such that the flow of current through valve 8 cannot reach the load limit thereof under variations to be expected in the value of the voltage of line 6, but such method has the disadvantage of causing the flow of current through transformer 12 and line 6 to occur at a decreased power factor thereby reducing the efficiency of the system.

As a result of the method of energization of each transformer 21, upon a sudden decrease of the voltage of line 6 occurring too rapidly to cause any appreciable movement of regulator 27, the magnetomotive force of winding 22 decreases to a proportionate extent, so that the rising intersection of curve 41 with line 42 is retarded and point A is correspondingly retarded during the voltage cycle. The voltage under which current is transmitted from line 7 to line 6 then no longer consists of the portions of curves 47 shown in Fig. 3, but consists instead of portions beginning at a later point of each voltage cycle and therefore of higher average value. The average voltage, or counterelectromotive force opposed by line 6 to line 7 through valve 8 is thereby restored to substantially the value of such voltage obtaining before the occurrence of the decrease in the voltage of line 6, so that the flow of current through the system remains substantially unaffected, thereby avoiding disturbances in the operation of the regenerating motors and avoiding disturbance within the system by increase of the load beyond the load limit thereof.

It will be easily understood that a sudden increase in the voltage of line 7 due to the sudden initiation of regenerating operation of motors connected therewith would also result in an increase of the average counterelectromotive force opposed to line 7 by line 6 through valve 8, to thereby limit the flow of current between the lines to a value below the load limit of the system. If the variation in the line voltages are, on the contrary, such as to tend to reduce the flow of current between the lines, it will also be understood that the system automatically operates to tend to maintain such flow of current at the previous value thereof.

The voltage variations above considered were assumed to occur too rapidly to cause any movement of regulator 27 in response thereto.

During undisturbed operation of the system however, in the absence of regulator 27 the input voltage of valve 8 would be continually regulated in the manner above described and under such conditions, when the flow of current through the valve increases, the voltage of line 7 may be increased to a value which may be excessive for the proper operation of the motors connected with line 7 and supplying current thereto and of any other motors connected therewith and receiving current generated by the regenerating motors. Such action is corrected by the action of regulator 27. The regulator is actuated principally by the interaction of coils 31 and 32 acting against the constant torque of spring 30 and, as coil 32 is energized with constant current, the regulator will tend to maintain the current constant through coil 31 by movement of tap 29 over rheostat 26. As a result of the action of coil 35 however, any increase in the flow of current through shunt 34 and coil 35 causes the regulator to move to thereby reduce the flow of current through coil 31 to a corresponding extent, thereby also decreasing the flow of current through windings 23. The result thereof is to lower the ordinate of line 42 in Fig. 3, thereby causing point A, at which each control electrode releases the flow of current through the associated anode, to advance during the voltage cycle, whereby the counterelectromotive force of line 6 appearing through valve 8, which is substantially equal to the voltage of line 7, is also decreased. It will be understood that regulator 27 may be so adjusted that the voltage of line 7 may still increase slightly with increasing current therethrough, or that such voltage may be maintained constant when the flow of current through the line increases.

In the embodiment illustrated in Fig. 2, the control transformers 21 of Fig. 1, are shown as being replaced by a polyphase transformer 51. Such transformer is provided with a core having a separate leg for each of the phases thereof and is preferably provided with an additional leg for the return of the direct magnetizing flux component thereof as is well known. Transformer 51 is provided with a star connected secondary winding 52 having phase portions severally connected with the control electrodes 16 and with a star connected primary winding 53. Winding 53 is connected with the several phases of line 6 through a transformer 54 having a star connected secondary winding 56. The neutral point of winding 52 is connected with cathode 14 through battery 18 to impress on each control electrode superposed alternating and direct voltage components as in the embodiment illustrated in Fig. 1. The several legs of the core of transformer 51 are subjected to a polyphase system of alternating magnetomotive forces, the exciting current of each leg being maintained substantially sinusoidal or at least of wave shape similar to the wave shape of the voltage of line 6 by insertion of resistors 39 between windings 56 and 53, such resistors having impedances of high values relative to the impedances of the portions of winding 53. A unidirectional magnetomotive force is impressed on all the phase legs of the core of winding 51 by connection of the neutral point of winding 56 with the neutral point of winding 11 and of the neutral point of winding 53 with cathode 14 through rheostats 24 and 26. The several portions of winding 53 thus replace windings 22 and also windings 23 of the transformers 21 illustrated in Fig. 1. Each portion of winding 52 thus receives induced voltages which are exactly similar to the voltages of windings 19 of the embodiment illustrated in Fig. 1, so that the operation of the system is entirely similar to that of the system illustrated in Fig. 1 and need not be further described.

Although but two embodiments of the present invention have been illustrated and described it will be apparent to those skilled in the art that various changes and modifications may be made therein without departing from the spirit of the invention or from the scope of the appended claims.

It is claimed and desired to secure by Letters Patent:

1. In combination, an electric current supply line, an electric current output line, an electric valve interconnecting said lines and having an anode with an associated control electrode and a cathode, a circuit connecting said control electrode with said cathode comprising a winding of a control transformer, said transformer having a core of saturable magnetic material and exciting winding means therefor, and means for connecting said winding means with both said lines for energization therefrom for causing periodic reversal within said core of a magnetic flux of density causing substantial magnetic saturation thereof.

2. In combination, an alternating current line, an electric valve connected with said line and having an anode with an associated control electrode and a cathode, a direct current line connected with said valve, a transformer having a core of saturable magnetic material and a winding connecting said control electrode with said cathode, exciting winding means for said transformer, and means for connecting said means with both said lines for causing the magnetic flux within said core to periodically vary from saturation value in the one direction to saturation value in the other direction.

3. In combination, an alternating current line, an electric valve connected with said line and having an anode with an associated control electrode and a cathode, a direct current line connected with said valve, a transformer having a core of saturable magnetic material and a winding connecting said control electrode with said cathode, means for exciting said control transformer with current of predetermined wave shape from said alternating current line, and means for exciting said control transformer with current from said direct current line, the first and second said means being so dimensioned as to cause periodic reversal within said core of a magnetic flux of density causing substantially magnetic saturation thereof.

4. In combination, an alternating current line, a direct current line, an electric valve connected with said lines for controlling the flow of current therebetween and having an anode with an associated control electrode and a cathode, a control transformer connected with said control electrode to regulate the flow of current through said valve, an alternating current exciting winding for said transformer, an electric filter connecting said winding with said alternating current line to cause said winding to receive substantially sinusoidal current from said line of the fundamental frequency of the voltage thereof, and means for exciting said transformer with direct current from said direct current line.

5. In combination, an alternating current line, a direct current line, an electric valve connected with said lines for controlling the flow of current therebetween and having an anode with an associated control electrode and a cathode, a control transformer connected with said control electrode to regulate the flow of current through said valve, an alternating current exciting winding for said transformer, an electric filter connecting said winding with said alternating current line to cause said winding to receive substantially sinusoidal current from said line of the fundamental frequency of the voltage thereof, and a second exciting winding for said transformer connected across said direct current line.

6. In combination, an alternating current line, a direct current line, an electric valve connected with said lines for controlling the flow of current therebetween and having an anode with an associated control electrode and a cathode, a control transformer connected with said control electrode to regulate the flow of current through said valve, an alternating current exciting winding for said transformer, means comprising a resistor connecting said winding with said alternating current line and being of high impedance relative to the impedance of said winding, and means for exciting said transformer with direct current from said direct current line.

7. In combination, an alternating current line, a direct current line, an electric valve connected with said lines for controlling the flow of current therebetween and having an anode with an associated control electrode and a cathode, a control transformer connected with said control electrode to regulate the flow of current through said valve, an alternating current exciting winding for said transformer, means comprising a resistor connecting with said winding with said alternating current line and being of high impedance relative to the impedance of said winding, and means for connecting said exciting winding across said direct current line.

8. In combination, an alternating current line, a direct current line, an electric valve connected with said lines for controlling the flow of current therebetween and having an anode with an associated control electrode and a cathode, a control transformer connected with said control electrode to regulate the flow of current through said valve, an exciting winding for said transformer, an auxiliary transformer connected with said line and having a secondary winding, a resistor of high impedance relative to the impedance of said exciting winding for interconnecting said windings, means for connecting said exciting winding with one of the conductors of said direct current line, and means for connecting said secondary winding with the other conductor of said direct current line.

9. In combination, an electric current supply line, an electric current output line, an electric valve having electrodes connected with said lines for controlling the flow of current therebetween, means instantly responsive to the relative values of the voltages of said lines for controlling the operation of said valve, and means less rapidly responsive to the magnitude of the flow of current in one of said lines for opposing the action of the first said means.

10. In combination, an electric current supply line, an electric current output line, an electric valve having electrodes connected with said lines for controlling the flow of current therebetween, instantly acting means tending to prevent fluctuations of the flow of current through said valve, and time delay means for overcoming the action of the first said means in response to the magnitude of the flow of current through said valve.

11. In combination, an alternating current line, a direct current line, an electric valve connected with said lines for controlling the flow of current therebetween and having an anode with an associated control electrode and a cathode, a control transformer connected with said control electrode to regulate the flow of current through said valve, means for exciting said control transformer with current of substantially sinusoidal wave shape from said alternating current line, means for exciting said control transformer with current from said direct current line, and a regulator responsive to the magnitude of the flow of current through said valve for controlling the action of the second said means.

12. In combination, an alternating current line, a direct current line, an electric valve connected with said lines for controlling the flow of current therebetween and having an anode with an associated control electrode and a cathode, a control transformer connected with said control electrode to regulate the flow of current through said valve, means for exciting said control transformer with current of substantially sinusoidal wave shape from said alternating current line, means for connecting said transformer with said direct current line to receive unidirectional exciting current therefrom, and means responsive to an electrical condition of said valve for controlling the magnitude of said unidirectional exciting current.

13. In combination, an alternating current line, a direct current line, an electric valve connected with said lines for controlling the flow of current therebetween and having an anode with an associated control electrode and a cathode, a control transformer connected with said control electrode to regulate the flow of current through said valve, an alternating current exciting winding for said transformer, an electric filter connecting said winding with said alternating current line to cause said winding to receive substantially sinusoidal current from said line of the fundamental frequency of the voltage thereof, means for connecting said transformer with said direct current line to receive unidirectional exciting current therefrom, and means responsive to an electrical condition of said valve for controlling the magnitude of said unidirectional exciting current.

14. In combination, an alternating current line, a direct current line, an electric valve connected with said lines for controlling the flow of current therebetween and having an anode with an associated control electrode and a cathode, a control transformer connected with said control electrode to regulate the flow of current through said valve, an alternating current exciting winding for said transformer, an electric filter connecting said winding with said alternating current line to cause said winding to receive substantially sinusoidal current from said line of the fundamental frequency of the voltage thereof, a second exciting winding for said transformer connected across said direct current line, a rheostat in circuit with said second exciting winding, and means responsive to the magnitude of the flow of current through said valve for controlling the adjustment of said rheostat.

15. In combination an alternating current line, a direct current line, an electric valve connected with said lines for controlling the flow of current therebetween and having an anode with an associated control electrode and a cathode, a control transformer connected with said control electrode to regulate the flow of current through said valve, an alternating current exciting winding for said transformer, means comprising a resistor connecting said winding with said alternating current line and being of high impedance relative to the impedance of said winding, means for connecting said transformer with said direct current line to receive unidirectional exciting current therefrom, and means responsive to an electrical condition of said valve for controlling the magnitude of said unidirectional exciting current.

16. In combination, an alternating current line, a direct current line, an electric valve connected with said lines for controlling the flow of current therebetween and having an anode with an associated control electrode and a cathode, a control transformer connected with said control electrode to regulate the flow of current through said valve, an alternating current exciting winding for said transformer, means comprising a resistor connecting said winding with said alternating current line and being of high impedance relative to the impedance of said winding, means for connecting said exciting winding across said direct current line, and means responsive to an electrical condition of said valve controlling the flow of current through the first said means.

17. The combination, an alternating current line, a direct current line, an electric valve connected with said lines for controlling the flow of current therebetween and having an anode with an associated control electrode and a cathode, a control transformer connected with said control electrode to regulate the flow of current through said valve, an exciting winding for said transformer, an auxiliary transformer connected with said line and having a secondary winding, a resistor of high impedance relative to the impedance of said exciting winding for interconnecting said windings, means for connecting said exciting winding with one of the conductors of said direct current line, means for connecting said secondary winding with the other conductor of said direct current line, and means responsive to an electrical condition of said valve controlling the flow of current through the first and second said means.

18. In combination, an alternating current line, a direct current line, an electric valve connected with said lines for controlling the flow of current therebetween and having an anode with an associated control electrode and a cathode, a control transformer connected with said control electrode to regulate the flow of current through said valve, an exciting winding for said transformer, an auxiliary transformer connected with said line and having a secondary winding, a resistor of high impedance relative to the impedance of said exciting winding for interconnecting said windings, means for connecting said exciting winding with one of the conductors of said direct current line, means for connecting said secondary winding with the other conductor of said direct current line, and means responsive to the magnitude of the flow of current through said valve for controlling the flow of current through the first and second said means.

19. In a system for generating a periodic voltage, a source of alternating current, a source of direct current, a transformer having a core of saturable magnetic material and an output winding, means for connecting said transformer with said source of alternating current to excite said transformer with current of sinusoidal wave shape, means for connecting said transformer with said source of direct current to excite said transformer with direct current, and a current consuming device connected with said output winding to receive a periodic voltage therefrom.

20. The combination with an electric valve having an anode and a cathode constituting spaced electrodes for the flow of current periodically therebetween, of means for controlling the moments of recurring initiation of said flow of current comprising a control electrode constituting an element of said valve, means comprising a source of current having connection with said cathode and said control electrodes and exciting the latter in such sense as to prevent the said initiations of said flow of current, means for continually exciting said control electrode in such sense as to permit said initiations of said flow of current comprising a transformer having a core of saturable magnetic material and a winding connecting said cathode with said control electrode, means for concurrently exciting said transformer with current of unidirection and with alternating current of such wave shape as to cause continual reversal within said core of a magnetic flux of density causing substantially magnetic saturation thereof in each direction of flow of said flux, and means operable responsive to and in dependence upon the magnitude of the said flow of current for controlling the action of said current of unidirection.

21. In a current converting system, the combination with an electric current supply line, an electric current ouput line, and an electric valve connected with said lines for controlling the flow of current therebetween and having an anode with an associated control electrode and a cathode, of means for continuously regulating the conductivity of said valve comprising a control transformer connecting said control electrode with said cathode to control the flow of current through said valve, means for exciting said transformer with alternating current, means for variably exciting said transformer with direct current, and means responsive to an operating condition of said system for regulating the degree of action of the second said exciting means.

22. In a current converting system, the combination with an electric current supply line, an electric current output line, and an electric valve connected with said lines for controlling the flow of current therebetween and having an anode with an associated control electrode and a cathode, of means for continuously regulating the conductivity of said valve comprising a control transformer connecting said control electrode with said cathode to control the flow of current through said valve, means for exciting said transformer with alternating current, means for exciting said transformer with direct current, and means responsive to the magnitude of the flow of current through said valve for regulating the degree of action of the second said exciting means.

23. In a current converting system, the combination with an electric current supply line, an electric current output line, and an electric valve connected with said lines for controlling the flow of current therebetween and having an anode with an associated control electrode and a cathode, of means for continuously regulating the conductivity of said valve comprising a control transformer connecting said control electrode with said cathode to control the flow of current through said valve, means for exciting said transformer with alternating current, means for variably exciting said transformer with direct current, and means responsive to the magnitude of the voltage of said direct current line for controlling the action of the second said exciting means.

24. In an electric current converting system, the combination with an alternating current line, a direct current line, and electric valve means comprising an anode and a cathode interconnecting said lines and constituting spaced electrodes for the flow of current therebetween, of means for regulating said flow of current comprising an element of said valve means other than said electrodes, a control transformer comprising a plurality of windings, means comprising an electric filter connecting a first one of said windings with said alternating current line, means connecting a second one of said windings with a source of direct current, and means connecting a third one of said windings with said element and with said cathode.

25. In an electric current converting system, the combination with an alternating current line, a direct current line, and electric valve means comprising an anode and a cathode interconnecting said lines and constituting spaced electrodes for the flow of current therebetween, of means for regulating said flow of current comprising an element of said valve means other than said electrodes, a control transformer comprising a plurality of windings, means comprising an electric filter connecting a first one of said windings with said alternating current line, means connecting a second one of said windings across said direct current line, and means connecting a third one of said windings with said element and with said cathode.

26. In an electric current converting system, the combination with an alternating current line, a direct current line, and electric valve means comprising an anode and cathode interconnecting said lines and constituting spaced electrodes for the flow of current therebetween, of means for regulating said flow of current comprising an element of said valve means other than said electrodes, a control transformer comprising a plurality of windings, means comprising an electric filter connecting a first one of said windings with said alternating current line, means connecting a second one of said windings across said direct current line, means comprising a third one of said windings connecting said element with said cathode, and means operable responsive to an operating condition of said system for varying the said connection of the said second one of said windings.

27. In an electric current converting system, the combination with an alternating current line, a direct current line, and electric valve means comprising an anode and a cathode interconnecting said lines and constituting spaced electrodes for the flow of current therebetween, of means for regulating said flow of current comprising an element of said valve means other than said electrodes, means for impressing on said element a potential of such sign and magnitude as to prevent the initiation of said flow of current, means comprising an electric filter and an inductive member connected with said alternating current line for continually impressing on said element a potential of such sign and magnitude relative to the first said potential and during such moments relative to the voltage cycle of said alternating current line as to permit the initiation of said flow of current, means for varying the moments of the said impression of the second said potential on said element relative to the voltage cycle of said alternating current line comprising means for varying the inductance of said member, and means operable responsive to changes in at least one operating condition of said system for controlling the action of the fifth said means.

28. In combination, an alternating current line, a direct current line, an electric valve connected with said lines for controlling the flow of current therebetween and having an anode with an associated control electrode and a cathode, a control transformer connected with said control electrode to regulate the flow of current through said valve, an alternating current exciting winding for said transformer, means comprising an element having high impedance relative to the impedance of said winding connecting the latter with said alternating current line, and means for exciting said transformer with direct current from said direct current line.

ERWIN KERN.

CERTIFICATE OF CORRECTION.

Patent No. 2,148,049.   February 21, 1939.

ERWIN KERN.

It is hereby certified that error appears in the printed specification of the above numbered patent requiring correction as follows: Page 4, second column, line 29, claim 7, strike out the word "with" first occurrence; and that the said Letters Patent should be read with this correction therein that the same may conform to the record of the case in the Patent Office.

Signed and sealed this 4th day of April, A. D. 1939.

(Seal)   Acting Commissioner of Patents.